United States Patent [19]
Rosenberg

[11] Patent Number: 5,575,911
[45] Date of Patent: Nov. 19, 1996

[54] BACK-FLUSHABLE FILTER HAVING VALVED FLUSING PATHWAY

[75] Inventor: Peretz Rosenberg, Moshav Beit Shearim, Israel

[73] Assignee: Super Disc Filters Ltd., Natania, Israel

[21] Appl. No.: 389,476

[22] Filed: Feb. 16, 1995

[30] Foreign Application Priority Data

Mar. 28, 1994 [IL] Israel ......................................... 109141
Aug. 8, 1994 [IL] Israel ......................................... 110586

[51] Int. Cl.$^6$ .................................................. B01D 29/68
[52] U.S. Cl. .................. 210/333.01; 55/224; 55/302; 210/107; 210/333.1; 210/411; 210/427; 210/456
[58] Field of Search ................................ 210/107, 108, 210/333.1, 411, 440, 444, 446, 456, 488, 333.01, 425–427, 418; 55/224, 230, 239, 242, 302, 303

[56] References Cited

U.S. PATENT DOCUMENTS

| | | | |
|---|---|---|---|
| 3,994,810 | 11/1976 | Schaffer | 210/108 |
| 4,026,806 | 5/1977 | Drori | 210/405 |
| 4,042,504 | 8/1977 | Drori | 210/107 |
| 4,156,651 | 5/1979 | Mehoudar | 210/108 |
| 4,552,655 | 11/1985 | Granot | 210/108 |
| 4,592,839 | 6/1986 | Rosenberg | 210/352 |
| 4,614,581 | 9/1986 | Drori | 210/108 |
| 4,632,757 | 12/1986 | Rosenberg | 210/411 |
| 4,655,910 | 4/1987 | Tabor | 210/107 |
| 4,661,250 | 4/1987 | Rosenberg | 210/411 |
| 4,710,284 | 12/1987 | Amit . | |
| 4,762,615 | 8/1988 | Drori | 210/333.01 |
| 4,806,217 | 2/1989 | Rosenberg | 210/333.1 |
| 4,923,601 | 5/1990 | Drori | 210/107 |
| 4,935,126 | 6/1990 | Drori | 210/107 |
| 4,995,968 | 2/1991 | Snelling | 210/488 |
| 5,228,993 | 7/1993 | Dori | 210/107 |

*Primary Examiner*—Joseph W. Drodge
*Attorney, Agent, or Firm*—Benjamin J. Barish

[57] ABSTRACT

A filter operable in either a filtering mode or in a flushing mode, includes a cylindrical filter body, and a plurality of partitions defining a plurality of axially-extending, circumferentially-spaced filter compartments each communicating with an axial section of the filter body. All the filter compartments communicate with the fluid inlet except for at least one filter compartment which is blocked. A flushing pathway is provided between each blocked compartment and the flushing outlet. A valve in the flushing pathway is movable either to (a) a closed position during the normal filtering mode, or (b) an open position during the flushing mode.

20 Claims, 8 Drawing Sheets

BACK-FLUSHABLE FILTER HAVING VALVED FLUSING PATHWAY

FIELD AND BACKGROUND OF THE INVENTION

The present invention relates to filters and particularly to back-flushable filters which can be cleaned by back-flushing through the filter body.

Many filter constructions are known which permit the filter to be cleaned by back-flushing through the filter body. Generally, such filters are operable either in a normal filtering mode wherein they perform their normal filtering functions of removing solid particles from a fluid (e.g., water) circulated through the filter, or in a flushing mode wherein they clean the filter by back-flushing the filter body. Examples of such filter constructions are described in my prior U.S. Pat. Nos. 4,632,757 and 4,806,217.

OBJECTS AND BRIEF SUMMARY OF THE INVENTION

An object of the present invention is to provide a filter which can be efficiently operated in either the normal filtering mode, or in a flushing mode wherein only one section, or a few sections, of the filter body are cleaned at any given instant by back-flushing, all the sections being sequentially cleanable in this manner, while the sections not being flushed at any given instant perform their normal filtering function. Another object of the invention is to provide a filter of the foregoing type made of relatively few simple parts which can be produced and assembled in volume and at low cost.

According to the present invention, there is provided a filter operable in either a filtering mode or in a flushing mode, comprising: a housing including a cylindrical filter chamber, and further including a fluid inlet, a fluid outlet, and a flushing outlet communicating with the filter chamber; a cylindrical filter body disposed within the filter chamber and having an upstream face communicating with the fluid inlet and a downstream face communicating with the fluid outlet; and a plurality of partitions defining, with the housing and upstream face of the filter body, a plurality of axially-extending, circumferentially-spaced filter compartments each communicating with an axial section of the filter body. The filter further includes blocking means blocking communication between the fluid inlet and the at least one filter compartment, while unblocking the remaining filter compartments by permitting communication between them and the fluid inlet; and a flushing pathway between the blocked filter compartment and the flushing outlet. A valve in the flushing pathway is movable either: (a) to a closed position during the normal filtering mode, wherein a filtering operation is performed by all the axial sections of the filter body communicating with the unblocked filter compartments to filter the fluid flowing from the fluid inlet to the fluid outlet, or (b) to an open position during the flushing mode, wherein the same filtering operation is performed by all the axial sections of the filter body communicating with the unblocked filter compartments, and a flushing operation is performed to flush, via the flushing outlet, each section of the filter body communicating with a blocked filter compartment. The blocking means is rotatable with respect to the filter body to enable the blocking means to be aligned with, and thereby to perform a flushing operation with respect to, all the axial sections of the filter body.

As will be described more particularly below, a valve constructed in accordance with the foregoing features may be efficiently operated according to a normal filtering mode, or according to a flushing mode in which the various sections of the filter body are sequentially flushed while the sections not being flushed at any particular instant continue to perform their normal filtering functions. In addition, such filters may be constructed of a few, relatively simple part which can be produced in volume and at low cost.

Several embodiments of the invention are described below for purposes of example.

According to one described embodiment, the filter body is fixed, and the blocking member is rotatable with respect to the filter body. In addition, the valve includes a valve stem for moving the valve to either its open or closed position. The valve stem is coupled to a handle manually movable externally of the housing and is also coupled to the blocking member within the housing for rotating it with respect to the filter body.

According to a second described embodiment, the housing includes an inner tubular section formed with the fluid inlet at one end and with the fluid outlet at the opposite end, and an outer cylindrical section formed with the flushing outlet. The outer cylindrical section is movable axially with respect to the inner tubular section to operate the valve, and is also movable angularly with respect to the inner tubular section to rotate the blocking member with respect to the filter body. In this embodiment, the valve includes an annular seal received between the inner tubular section and the outer cylindrical section in the closed position of the valve, the annular seal being fixed to one of the sections such that it is spaced from the other section when the outer cylindrical section is moved axially to the open position of the valve.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

The Filter of FIGS. 1–6

The filter illustrated in FIGS. 1–6 is particularly useful for filtering water, but may also be used for filtering other fluids such as other liquids, air, or other gasses. The filter includes a housing 2 formed with an inlet 3 for the water (or other fluids) to be filtered, an outlet 4 for the water after it has been filtered, and a flushing outlet 5 for flushing out of the housing, during a flushing mode of operation, the dirt removed from the water during the normal filtering operation.

Figure 1:
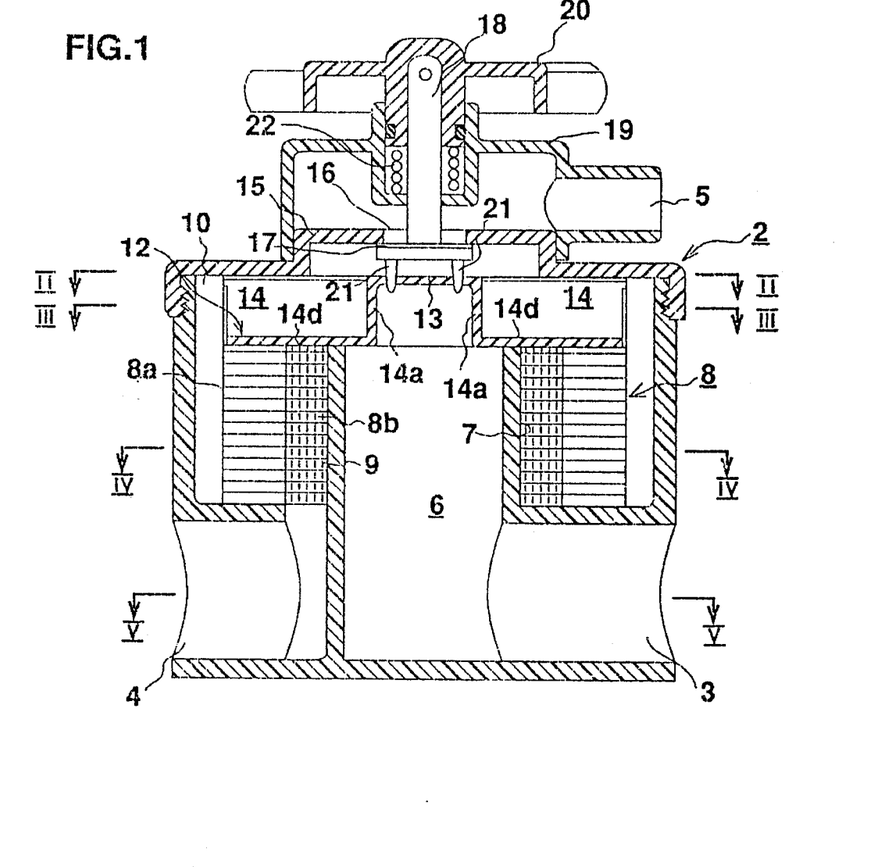
Fig. 1 is a longitudinal sectional view illustrating one form of filter constructed in accordance with the present invention, the filter being shown in its normal filtering mode of operation.

Inlet 3 communicates, via an axial passage 6, with a cylindrical filter chamber 7 within housing 2. A cylindrical filter body 8 is disposed within filter chamber 7. The outer surface 8a of the filter body 8 communicates with the fluid inlet 3 via axial passageway 6 and thus constitutes the upstream face of the filter body; whereas the inner surface 8b of the cylindrical body communicates with the fluid outlet 4 via an annular passageway 9 between the filter body and the axial passageway 6.

The cylindrical filter body 8 is constituted of a stack of filter discs having contacting faces formed with ribs to define filtering passageways between each pair of discs. As one example, the filter body 8 may be constructed as described in my prior U.S. Pat. No. 4,661,250. It will be appreciated, however, that other filter body constructions may be used, e.g., cylindrical screens.

Figure 2:
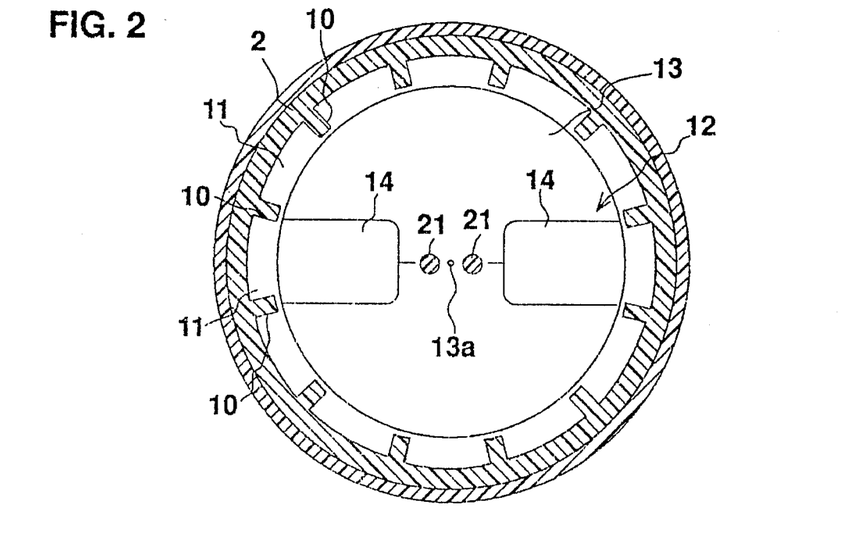
FIGS. 2, 3, 4 and 5 are sectional views along lines II—II, III—III, IV—IV and V—V of FIG. 1 respectively.
Figure 3:
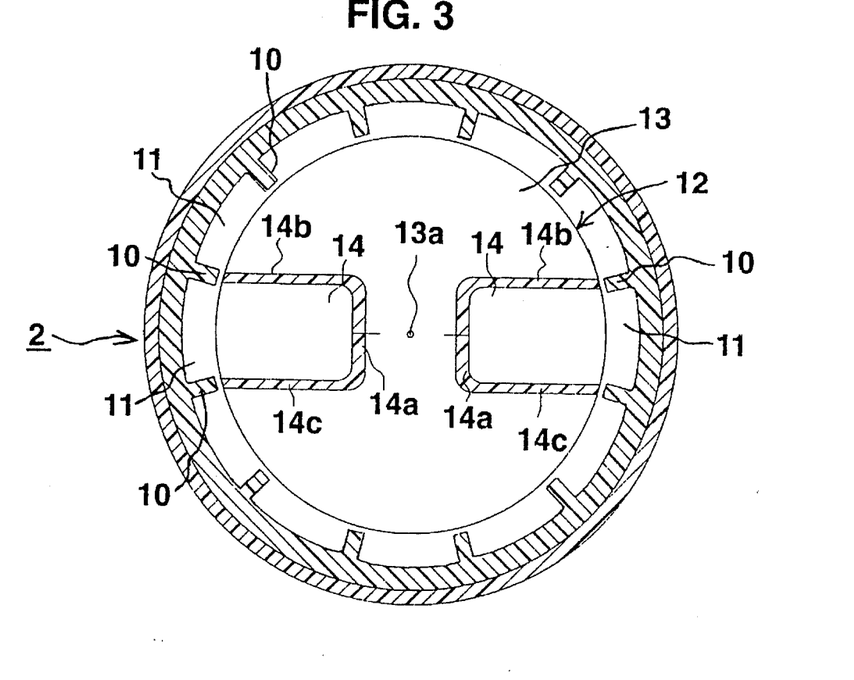
Figure 4:
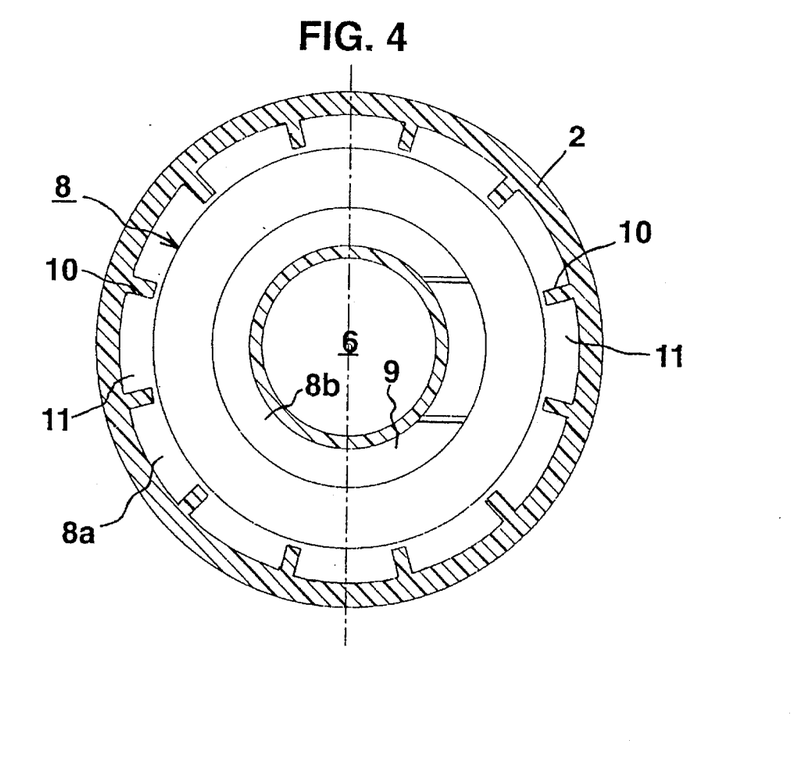
Figure 5:
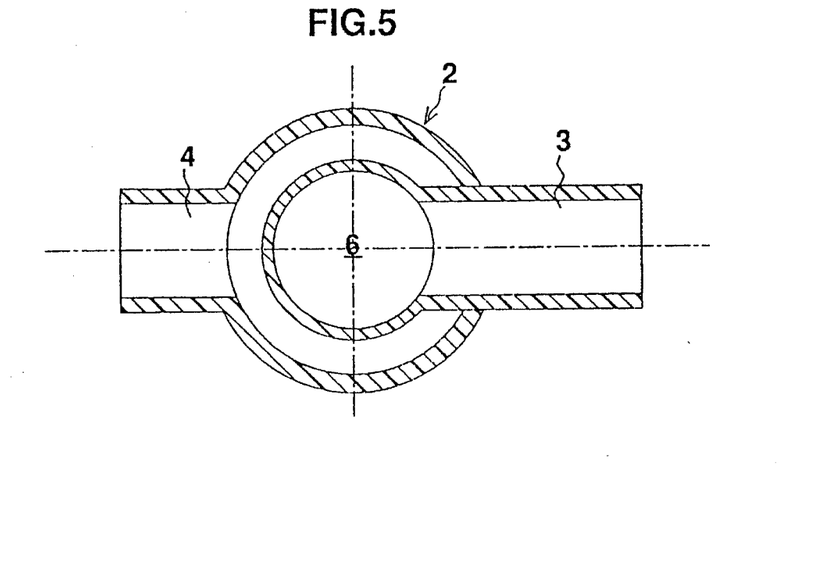

The inner surface of housing 2 is formed with a plurality of axially-extending, circumferentially-spaced ribs 10 which are dimensioned so that their tips engage the outer surface of the cylindrical filter body 8. As shown in FIGS. 2–4, ribs 10 serve as partitions cooperable with the outer surface of the cylindrical filter body 8 to define a plurality of axially-extending, circumferentially-spaced filter compartments 11 each communicating with a corresponding axially-extending portion or section of the filter body 8. In the example illustrated, there are twelve ribs defining twelve filter compartments 11.

The illustrated filter further includes a blocking member, generally designated 12, which blocks communication between the fluid inlet 3 and at least one of the filter compartments 11, while permitting communication between the fluid inlet and the remaining filter compartments. In the example illustrated in FIGS. 1–6, blocking member 12 includes a circular disc 13 of the same diameter as the cylindrical filter body 8, and is formed with two rectangular-shaped blocking elements 14 on opposite sides of the center point 13a of the disc. Each blocking element 14 is in the configuration of a U-shaped wall having a middle wall 14a, two parallel end walls 14b, 14c (FIG. 3) spaced apart the distance between a pair of the ribs 10 and aligned with those ribs, and a bottom wall 14d (FIG. 1). Each blocking element 14 thus blocks the filter compartment 11 defined by the two ribs 10 with which the blocking element is aligned, and has an open side facing the filter compartment blocked thereby.

It will thus be seen that in the arrangement illustrated particularly in FIGS. 2–4, in any one position of the blocking member 12, its two blocking elements 14 block the two filter compartments 11 on opposite sides of the filter, while unblocking the remaining ten filter compartments.

Housing 2 includes a wall 15 (FIGS. 1, 6) which separates the filter chamber 7 from the flushing outlet 5. Wall 15 is formed with a central opening 16 closable by a valve 17. Valve 17 is carried at one end of a stem 18; the opposite end of stem 18 passes through an opening in the end wall 19 of housing 2 and is connected to a handle 20 externally of the housing. Valve 17 also carries a pair of pins 21 passing through openings formed on opposite sides of the center 13a of the blocking member disc 13. A spring 22 urges handle 20 outwardly of housing 2, and valve 17 to its closed position with respect to opening 16.

The filter illustrated in FIGS. 1–6 may be used in the following manner:

Normally, spring 22 and the water pressure urge handle 20 outwardly of housing 2, and the valve 17 to its closed position with respect to opening 16, as illustrated in FIG. 1. In this valve-closed position, valve 17 blocks communication between the filter chamber 7 and the flushing outlet 5. In addition, the open end of each of the two blocking elements 14 of the blocking member 12 is aligned with one of the filter compartments 11.

When the filter is in this condition, it will perform a normal filtering operation with respect to the ten axial sections of the filter body 8 aligned with the ten ublocked filter compartments 11. Thus, in the normal filtering mode, the water introduced via inlet 3 flows through the axial passage 6, under disc 13 of the blocking member 12 to all the filter compartments 11 except the two blocked by the blocking elements 14 of blocking member 12, to the upstream (outer) surface 8a of all the axial sections of the filter body 8 exposed to the unblocked filter compartments 11, through the filter discs of the filter body 8 to the downstream (inner) side of the filter body, and out via passageway 9 to the outlet 4.

During this operation, communicating between the flushing outlet 5 and the two filtering compartments 11 blocked by the two blocking elements 14 is blocked by the closed valve 17 so that no flushing action is performed at this time.

Figure 6:
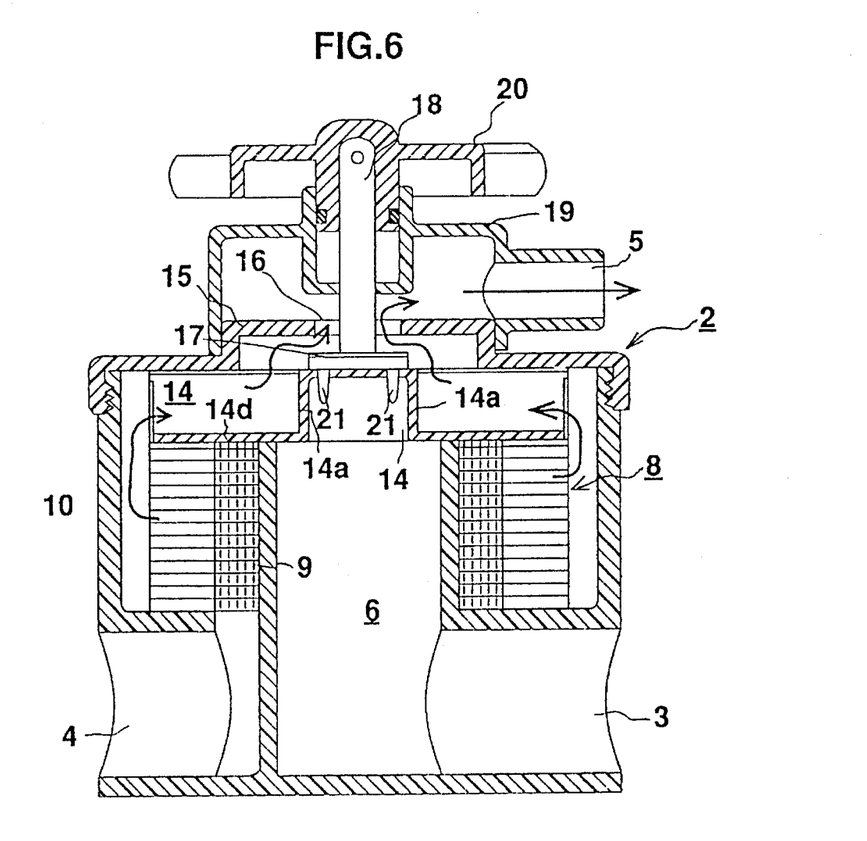
FIG. 6 is a view similar to that of Fig. 1 but showing the filter in its flushing mode of operation.

To have the filter perform a flushing action in a flushing mode of operation, handle 20 is grasped and pushed inwardly, to move valve 17 to its open position with respect to opening 16, as shown in FIG. 6. This connects the interior of blocking elements 14 of blocking member 12 to the flushing outlet 5. In this condition of the filter, the higher pressure of the water at the downstream (inner) side 8b of the filter body 8 produces a reverse flow, as shown by the arrows in FIG. 6, through the two filter compartments 11 with which blocking elements 14 are aligned, and through the flushing outlet 5. The dirt accumulated on the upstream (outer) surface 8a of the two sections of the filter body 8 aligned with the two unblocked filter compartments 11 is thus flushed out through the flushing outlet 5. However, the normal filtering operation still continues with respect to the other ten filter sections aligned with the unblocked filter compartments 11, so that the filter continues to operate to perform its normal filtering function with respect to these sections of the filter body 8.

Handle 20 is then turned to rotate blocking member 12 in order to align its two blocking elements 14 successively with all the filter compartments 11, to thereby sequentially flush out the dirt particles accumulated on the upstream (outer) surface 8a of all the sections of the filter body.

It will thus be seen that the filter illustrated in FIGS. 1–6 may be operated according to a normal filtering mode by moving valve 17 to its closed position as illustrated in FIG. 1, or according to a flushing mode by moving the valve to its open position as illustrated in FIG. 6, and then rotating handle 20 to rotate the blocking member 12 to successively flush all the sections of the filter body 8 out through the flushing outlet 5.

The Filter of FIGS. 7–11

The filter illustrated in FIGS. 7–11 operates basically in the same manner as that of FIGS. 1–6 but is of a substantially different construction.

Thus, the filter illustrated in FIGS. 7–11 includes a housing, generally designated 30, constituted of an inner tubular section 31 and an outer cylindrical section 32 movable both axially and angularly with respect to section 31. The central tubular section 31 is formed at one end with a fluid inlet 33, and at the opposite end with a fluid outlet 34; whereas the outer cylindrical section 32 is formed with the flushing outlet 35. Direct communication between the fluid inlet 33 and the fluid outlet 34 is blocked by a circular partition disc 36 secured within the inner tubular section 31.

The space between the two housing sections 31 and 32 defines a cylindrical filter chamber 37 receiving a cylindrical filter body 38. As in the construction of FIGS. 1–6, the filtering body 38 may also be in the form of a stack of grooved filter discs.

Figure 7:
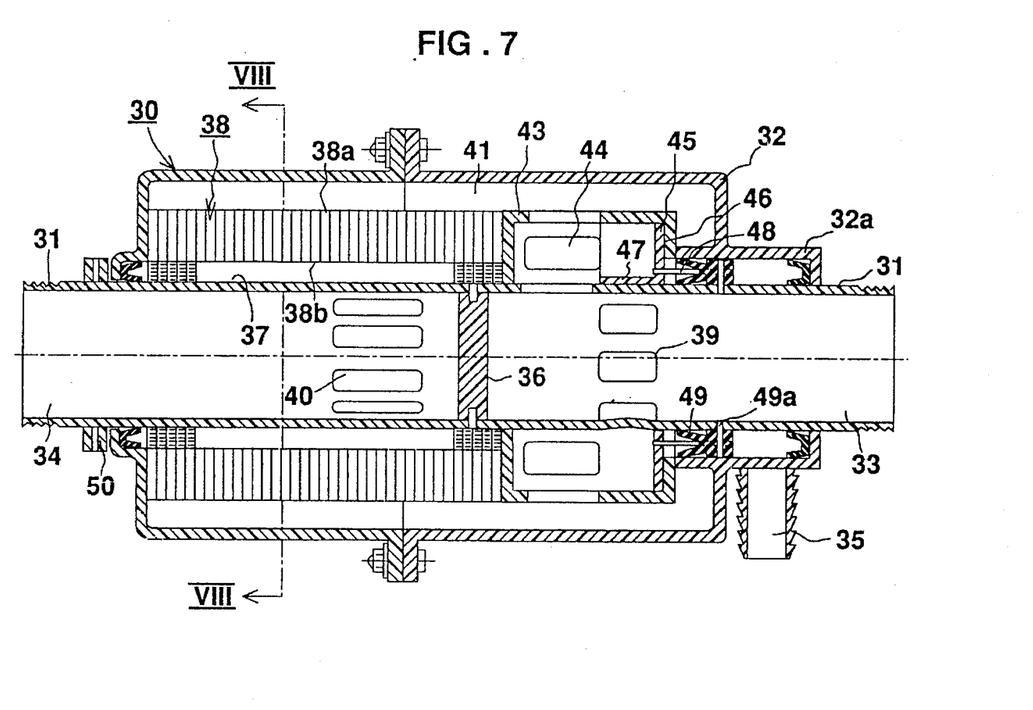
FIG. 7 is a longitudinal sectional view illustrating a second form of filter constructed in accordance with the present invention, the filter being shown in its normal filtering mode.
Figure 8:
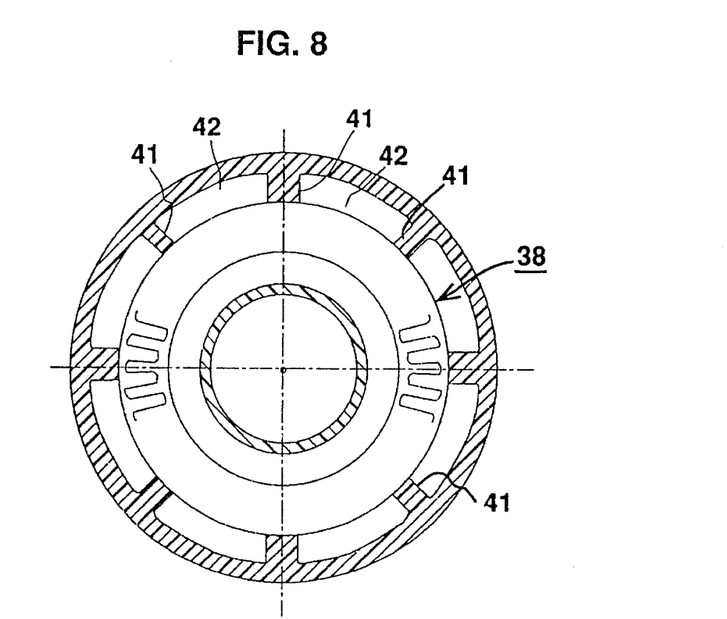
FIG. 8 is a sectional view along lines VIII—VIII of FIG. 7.
Figure 9:
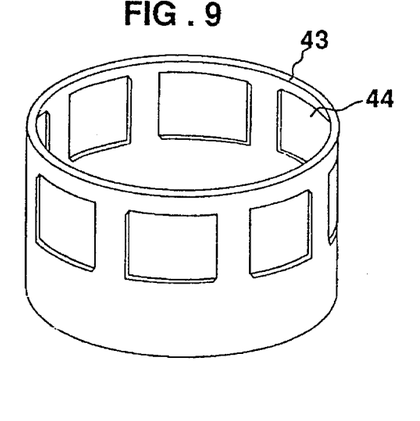
FIG. 9 is a perspective view of a sleeve included in the filter of FIG. 7.
Figure 10:
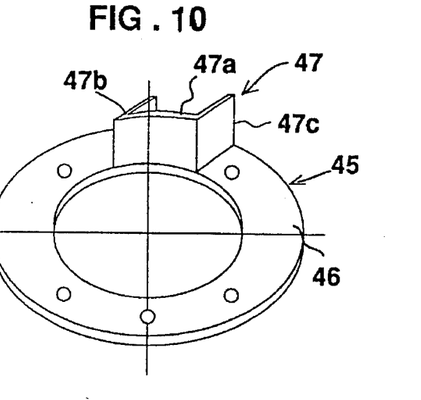
FIG. 10 is a perspective view illustrating the blocking member included in the filter of FIG. 7.

The inner tubular section 31 of housing 30 is formed with a first annular array of inlet openings 39 on one side of partition 36 to establish communication between the inlet 33 and the outer surface 38a of filter body 38, so that surface 38a of the filter body 38 constitutes its upstream face. Inner tubular section 31 is formed with an annular array of outlet openings 40 on the opposite side of partition disc 36 to establish communication between the inner surface 38b of the filter body 38 and the fluid outlet 34, so that surface 38b of the filter body constitutes its downstream face.

The outer cylindrical section 32 of housing 30 is formed with a plurality of axially-extending, circumferentially-spaced ribs 41 (FIG. 8) defining, with the outer surface of the filter body 38, a plurality of filter compartments 42. In the example illustrated in FIG. 8, there are eight such filter compartments, each exposed to an axial section of the filter body 38. A sleeve 43 (FIG. 9) is fixed to the outer cylindrical section 32 of the housing and is formed with an opening 44 for each of the filter compartments 42. The inner tubular section 31 of the housing is formed with one inlet opening 39 for each of the filter compartments 42.

A blocking member 45 (FIG. 10), including an annular disc 46 and a single blocking element 47, is fixed to housing section 31 by a plurality of pins 48 securing disc 46 to an annular seal 49, which in turn is fixed to housing section 31 by pins 49a. As shown particularly in FIG. 10, blocking element 47 is of substantially U-configuration. It includes a curved middle wall 47a conforming to the curvature of the inner housing section 31 and of a length to close one of its inlet openings 39. Blocking element 47 further includes a pair of parallel side walls 47b, 47c spaced apart a distance equal to the spacing between ribs 41 in the outer housing section 32 such that the interior of the blocking member communicates with one of the filter compartments 42 defined by ribs 41.

Annular seal 49 is fixed by pins 49a to the outer surface of the inner housing section 31 adjacent its inlet end 33. In the normal position of the outer housing section 32 illustrated in FIG. 7, seal 48 is received between housing section 31 and a reduced-diameter end 32a of housing section 32. It thereby serves as a valve which blocks communication between the interior of blocking element 47 and the flushing outlet 35 during the normal filtering mode of operation of the filter. However, when the outer housing section 32 is moved axially (rightwardly in FIG. 7) to the position illustrated in FIG. 11, the reduced-diameter end 32a of housing section 32 moves away from the annular seal 49 to thereby open the valve defined by the seal and to establish communication between the interior of blocking element 47 and the flushing outlet 35.

The inner tubular section 31 further includes a stop 50 to limit the axial position of the outer tubular section 32.

The filter illustrated in FIGS. 7–11 operates as follows:

In the normal filtering mode of operation, the outer housing section 32 is in the position shown in FIG. 7, against stop 50. In this condition of the filter, the valve defined by the annular seal 49 fixed to the inner housing section 31 is closed, i.e., engaging the reduced-diameter end 32a of housing section 32, thereby blocking communication between the interior of blocking element 47 and the flushing outlet 35.

The filter thus operates in a normal filtering mode, in which the water inletted via inlet 33 passes via all the openings 39, except the one blocked by blocking element 47, through openings 44 of sleeve 43 into the filter compartments 42 defined by the ribs 41, and through the respective axial sections of the filter body 38, the outlet openings 40, and out through the outlet 34. All the sections of the filter body 38 are thus effective to filter the water, except for the section facing the filter compartment 42 blocked by the blocking member 47.

Figure 11:
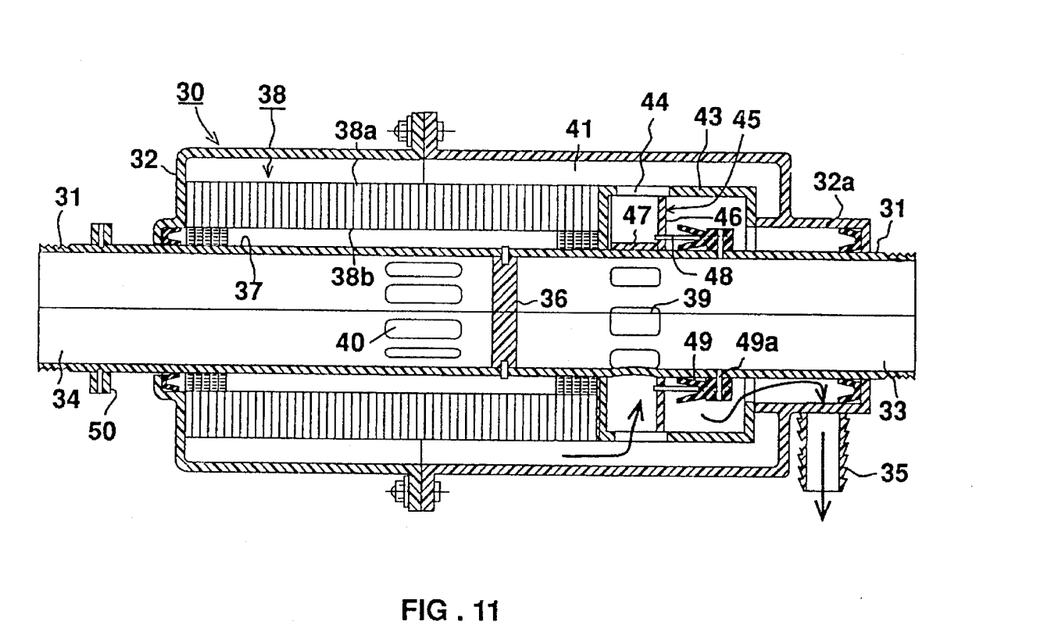
FIG. 11 is a view similar to that of FIG. 7 but illustrating the filter in its flushing mode of operation.

When it is desired to clean the filter body 38, the outer housing section 32 is manually grasped and moved rightwardly away from stop 50 to the position illustrated in FIG. 11. In this position of housing section 32, its end 32a moves away from the annular seal 49, to thereby open the valve defined by the seal and to establish communication between the interior of blocking element 47 and the flushing outlet 35. The pressurized water at the downstream face of the axial section of the filter body 38 facing the filter compartment 42 blocked by the blocking element 47 is now connected to the atmosphere via the flushing outlet 35. That section of the filter body is therefore flushed of any dirt particles on its upstream (outer) surface. The remainder of the filter body, however, continues to perform a normal filtering function.

The outer housing section 32 may then be manually rotated in order to sequentially align the interior of blocking element 47 with all the other filter compartments 42 through opening 44 of sleeve 43 to thereby flush the other sections of the filter body 38 out through the flushing outlet 35.

The Filter of FIGS. 12–16

The filter illustrated in FIGS. 12–16 includes a housing, generally designated 60, constituted of an inner tubular section 61 and an outer cylindrical section 62 movable only angularly (rotatably) with respect to the inner housing section 61. The inner housing section 61 is formed with a fluid inlet 63 at one end, a fluid outlet 64 at the opposite end, and a flushing outlet 65 at the same end as the fluid inlet 63. Direct communication between the fluid inlet 63 and fluid outlet 64 is blocked by a partition disc 66 within the inner housing section 61.

Figures 12, 13, 15:
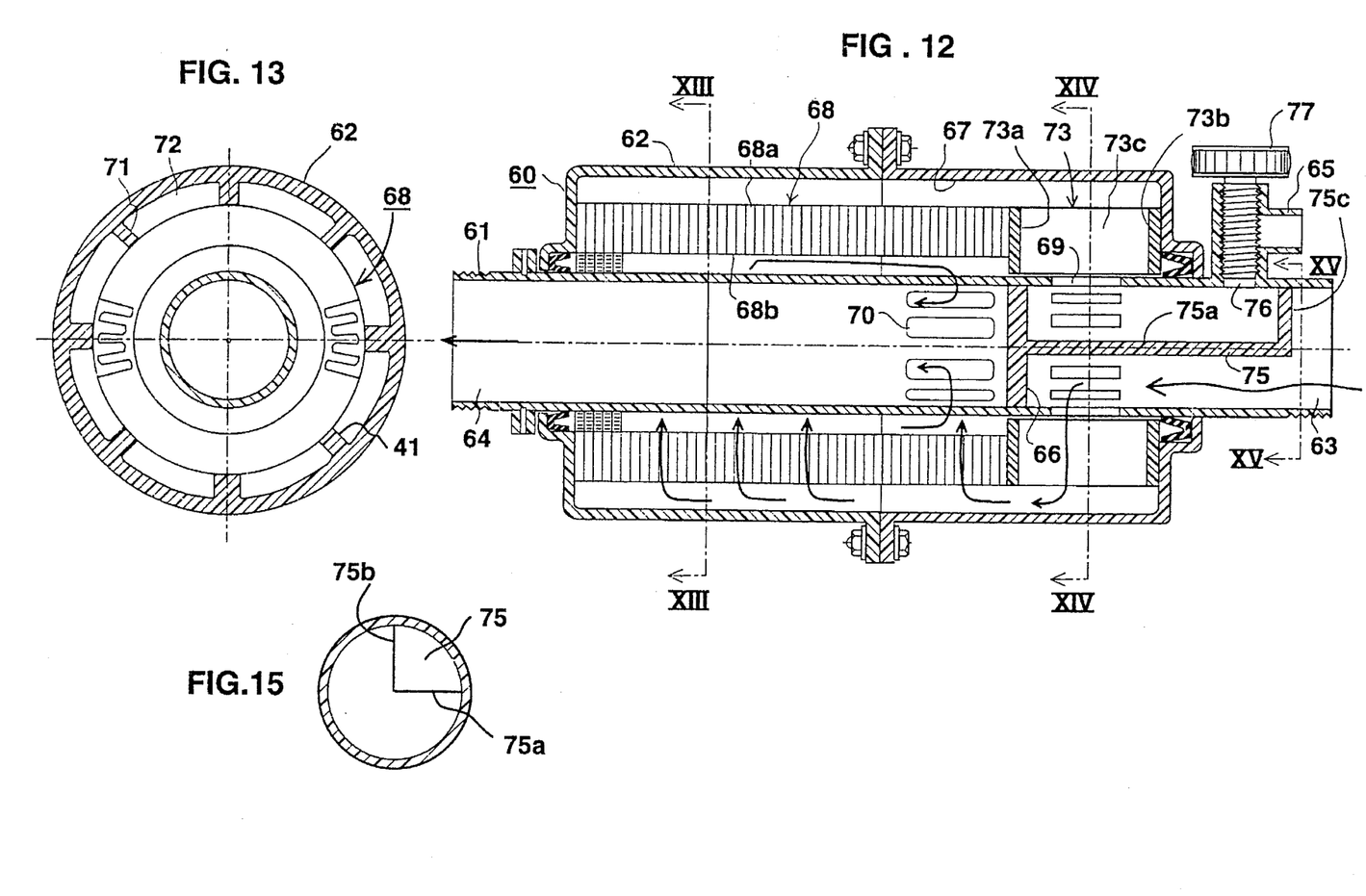
FIG. 12 is a longitudinal sectional view illustrating a further form of filter constructed in accordance with the present invention, the filter being shown in its normal filtering mode of operation.
FIGS. 13, 14 and 15 are sectional views along lines XIII—XIII, XIV—XIV and XV—XV of FIG. 12, respectively.
Figure 14:
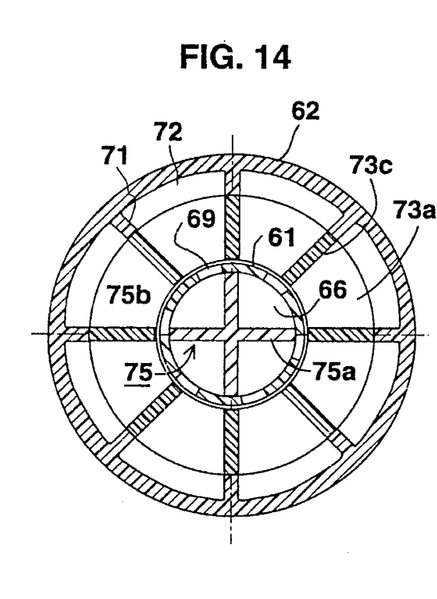
Figure 16:
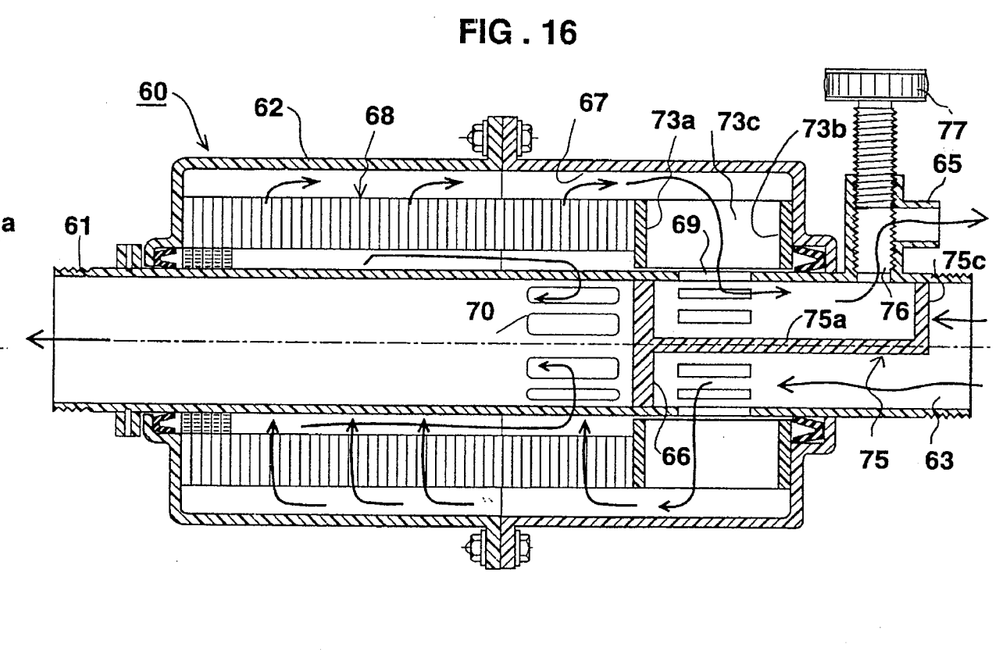
FIG. 16 is a view similar to that of FIG. 12 but showing the filter in its flushing mode of operation.

The space between the two housing sections 61 and 62 defines a cylindrical filter chamber 67 receiving a cylindrical filter body 68, e.g., a stack of grooved filter discs. An annular array of inlet openings 69 on one side of partition disc 66 establish communication between the inlet 63 and the outer surface 68a of filter body 68. An annular array of outlet openings 70 on the opposite side of partition disc 66 establish communication between the inner surface 68b of the filter body and the fluid outlet 64.

The outer housing section 62 is formed with a plurality of axially-extending, circumferentially-spaced ribs 71 defining a plurality of filter compartments 72 with the outer surface of filter body 68. Filter compartments 72 communicate with the inlet openings 69 via a radial vane assembly, generally designated 73, including a pair of end discs 73a, 73b, securing a plurality of radial vanes 73c between them. The vane assembly 73 and the filter body 68 are both secured within the outer housing section 62 so as to rotate with that section with respect to the inner housing section 61.

A blocking member, generally designated 75, is fixed within the inner housing section 61 between the fluid inlet 63 and the circular partition disc 66 so as to block at least one of the fluid inlet openings 69 from the fluid inlet 63. Blocking member 75 includes two radially-extending walls 75a, 75b joined together at their inner ends in alignment with the longitudinal axis of housing sections 61, and joined at their outer ends to housing section 61 so as to define a sector of a cylinder closed at one end by the circular partition disc 66, and closed at the opposite end by a circular disc sector 75c.

In the example illustrated in FIGS. 12–16, the ribs 71 define eight filter compartments 72; housing section 61 is formed with six inlet openings 69; and blocking member 75 defines a 90° sector of a cylinder.

The flushing outlet 65 communicates with the interior of blocking member 75 by means of a flushing opening 76 formed in housing section 61, and a manually-operated on/off valve 77.

The filter illustrated in FIGS. 12–16 operates as follows:

In the normal filtering mode of operation, shutoff valve 77 is in its closed position as illustrated in FIG. 12, thereby blocking communication between the flushing outlet 65 and the interior of blocking member 75. The filter thus operates in a filtering mode, in which the water inletted via inlet 63 passes through all the openings 69 into the filter chamber 67, except the opening located within the interior of the blocking member 75. All the sections 72 of the filter body 68 are thus effective to filter the water exiting via outlet opening 70 and outlet 64, except the inlet opening 69 located within blocking member 75.

When it is desired to clean the filter body 68, valve 77 is manually opened, thereby establishing communication between the interior of blocking member 75 and the flushing outlet 65. The pressurized water at the upstream (outer) face of filter body 68 facing the blocked inlet opening 69 is now connected to the atmosphere via the flushing outlet 65. That section of the filter body is therefore flushed of any dirt particles on its upstream (outer) surface, while the remaining sections of the filter body 68 continue to perform their normal filtering function.

The outer housing section 62 may then be manually rotated in order to sequentially align the radial vane assembly 73 with inlet opening 69 now connected to the atmosphere via blocking member 75, open valve 77, and flushing outlet 65. As each of the compartments 72 of the filter is brought into communication, via vane assembly 73, with opening 69 communicating with the atmosphere, the respective axial section of the filter 68 is similarly flushed of any dirt particles on its upstream (outer) surface.

Figure 17:
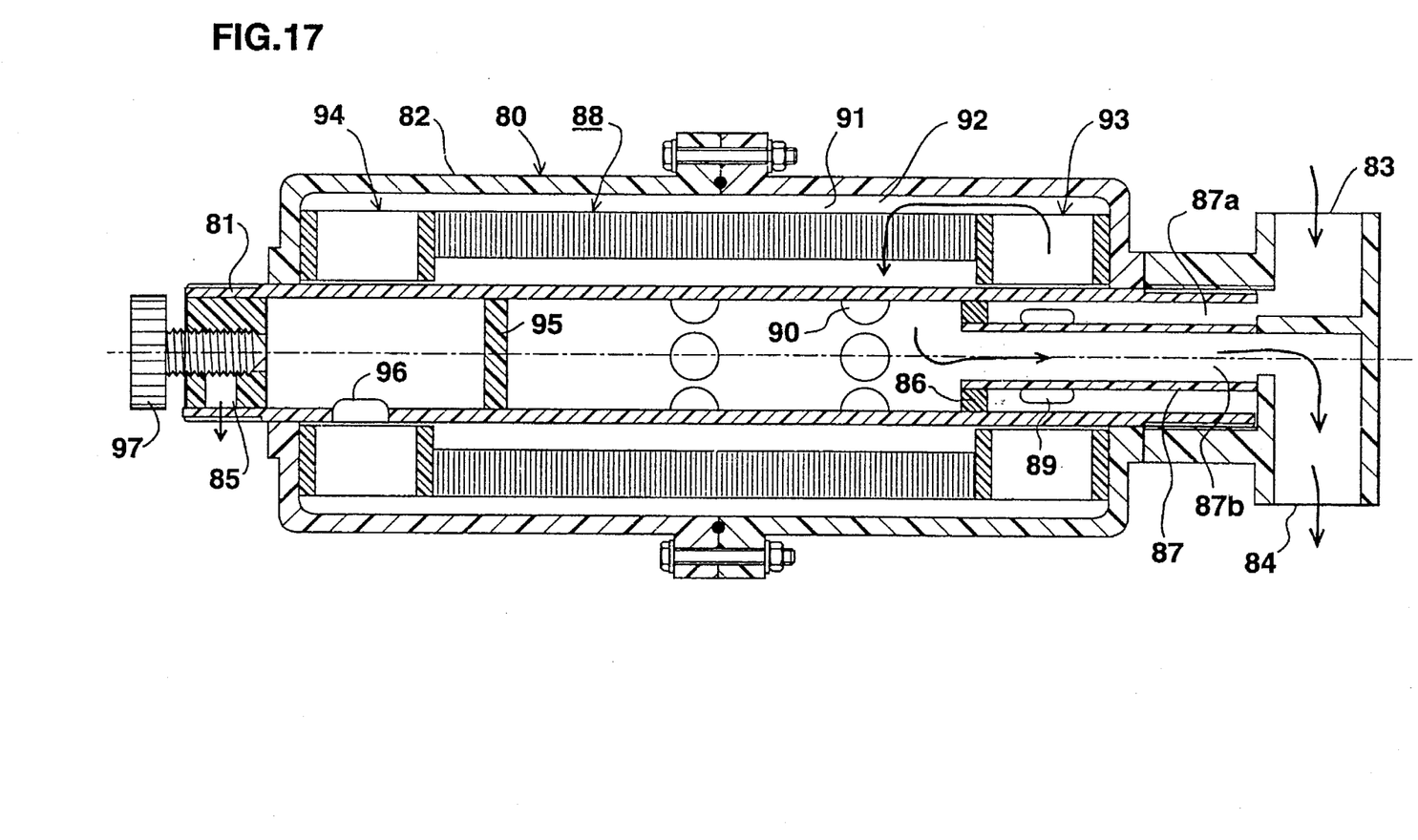
FIG. 17 is a longitudinal sectional view illustrating a further form of filter constructed in accordance with the present invention.

The Filter of FIG. 17

FIG. 17 illustrates a filter for attachment to a fluid line in an off-axis manner, i.e., with the longitudinal axis of the filter not in-line with the fluid line as in the embodiment of FIGS. 12–16. The filter of FIG. 17 thus also includes a housing, generally designated 80, constituted of an inner tubular section 81 and an outer cylindrical section 82. In this case, however, the outer housing section 82 is attached to the fluid line and therefore is fixed, whereas the inner housing section 81 is rotatable with respect to the outer housing section 82. Thus, the outer housing section 82 is formed with the fluid inlet 83 and with the fluid outlet 84, whereas the inner housing section is formed with the flushing outlet 85.

In the filter construction illustrated in FIG. 17, the fluid inlet 83 is separated from the fluid outlet 84 by a partition including an annular ring 86 and a separator tube 87 fixed at its inner end to annular ring 86 and extending axially of the inner housing section 81 to the fluid outlet 84. Separator tube 87 is coaxial with, but of smaller diameter than, the inner housing section 81 to define an annular inlet passageway 87a between it and housing section 81, and an outlet passageway 87b leading to the fluid outlet 84.

The space between the two housing sections 81 and 82 defines the filter chamber containing a cylindrical filter body 88, e.g., a stack of ribbed discs. The inner housing section 81 is formed with an annular array of inlet openings 89 on one side of partition ring 86 to communicate with the inlet passageway 87a, and with an annular array of outlet openings 90 on the opposite side of partition ring 86 to communicate with the outlet passageway 87b.

The inner surface of the outer housing section 82 is formed with a plurality of axially-extending ribs 91 defining a plurality of filter compartments 92 with the outer surface of the filter body 88, as in the filter of FIGS. 12–16. There is at least one inlet opening 89 in the inner housing section 82 for each of the filter compartments 92, except for one compartment which is to be blocked during the filter mode of operation and which is therefore devoid of an inlet opening 89. The portion of the inner housing section 82 devoid of an inlet opening 89 thus serves as blocking means blocking communication between the inlet and one of the filter compartments 92 during the filter mode of operation.

A radial vane assembly 93, of the same construction as assembly 73 in FIGS. 12–16, is provided at one end of the filter body 88. In this case, however, a second vane assembly 94 of the same construction is provided at the opposite end of the filter body.

A disc 95 is fixed within the inner housing section 81 between the fluid outlet openings 90 and the flushing outlet 85. That end of housing section 81 is formed with a flushing opening 96 radially aligned with radial vane assembly 94, and axially aligned with the portion of the inner housing section 82 devoid of an inlet opening 89. A manually controlled on/off valve 97 is provided at the end of housing section 81 to control the flushing outlet 85.

The filter illustrated in FIG. 17 operates as follows:

During the normal filtering mode of operation, valve 97 is in its closed condition as illustrated in FIG. 17. In this condition, the flushing outlet 85 is closed, so that the filter operates according to a normal filtering mode. Thus, the fluid inletted at 83 flows through the annular inlet passageway 87a and the inlet openings 89 to the outer (upstream) surface of all the filter compartments 92 except the one blocked by the lack of an inlet opening 89 in the inner housing section 89. The water then flows through the filter body 88 of the unblocked compartments 92, through the outlet openings 90, through the outlet passageway 87b, and out through outlet 84. All the axial sections of the filter body 88 aligned with the unblocked compartments 92 will therefore perform a normal filtering function.

When it is desired to clean the filter, valve 97 is opened, thereby establishing communication between the atmosphere and the blocked filter compartment 92 with which the flushing opening 96 is aligned. Accordingly, that axial section of the filter body 88 will be back-flushed via the flushing outlet 85. The inner housing section 81 of the filter may then be manually rotated in order to bring the flushing opening 96 successively into alignment with all the other axial sections of the filter body 88 to flush them out in succession.

While the invention has been described with respect to several preferred embodiments, it will be appreciated that these are set forth merely for purposes of example, and that many variations may be made. For example, the invention could be included in automatically-operated filters having sensors for sensing the differential pressure between the upstream and downstream sides of the filter body and, in response thereto, automatically open the valve to produce a flushing operation, and/or also automatically rotate the blocking member to sequentially flush all the sections of the filter body. Many other variations, modifications and applications of the invention will be apparent.

I claim:

1. A filter operable in either a filtering mode or in a flushing mode, comprising:

a housing including a cylindrical filter chamber, and further including a fluid inlet, a fluid outlet, and a flushing outlet communicating with said filter chamber;

a cylindrical filter body disposed within said filter chamber and having an upstream face communicating with said fluid inlet and a downstream face communicating with said fluid outlet;

a plurality of partitions defining, with the housing and upstream face of the filter body, a plurality of axially-extending, circumferentially-spaced filter compartments each communicating with an axially-extending section of the filter body;

blocking means for blocking communication between said fluid inlet and at least one filter compartment, while unblocking each remaining filter compartment by permitting communication with said fluid inlet;

a flushing pathway between each blocked filter compartment and said flushing outlet;

and a valve in said flushing pathway movable either: (a) to a closed position during the normal filtering mode, wherein a filtering operation is performed in each unblocked filter compartment to filter the fluid flowing from the fluid inlet to the fluid outlet, or (b) to an open position during the flushing mode, wherein the same filtering operation is performed in each unblocked filter compartment, and a flushing operation is performed to flush, via the flushing outlet, in each blocked filter compartment;

said blocking means and filter body being rotatable relative to each other to enable said blocking means to be aligned with, and thereby to perform a flushing operation with respect to, all the axially-extending sections of the filter body.

2. The filter according to claim 1, wherein said partitions are constituted of a plurality of axially-extending circumferentially-spaced ribs formed on the inner surface of the housing.

3. The filter according to claim 1, wherein said filter body is fixed, and said blocking means includes a blocking member rotatable with respect to said filter body.

4. The filter according to claim 3, wherein said valve includes a valve stem for moving the valve to either its open position or closed position.

5. The filter according to claim 4, wherein said valve stem is also coupled to said blocking member for rotating it with respect to the filter body.

6. The filter according to claim 4, wherein said valve stem passes through said housing and is coupled to a handle manually movable from externally of the housing.

7. A filter operable in either a filtering mode or in a flushing mode, comprising;

a housing including a cylindrical filter chamber, and further including a fluid inlet, a fluid outlet, and a flushing outlet communicating with said filter chamber;

a cylindrical filter body disposed within said filter chamber and having an upstream face communicating with said fluid inlet and a downstream face communicating with said fluid outlet;

a plurality of partitions defining, with the housing and upstream face of the filter body, a plurality of axially-extending, circumferentially-spaced filter compartments each communicating with an axially-extending section of filter body;

blocking means for blocking communication between said fluid inlet and at least one filter compartment, while unblocking each remaining filter compartment by permitting communication with said fluid inlet;

a flushing pathway between each blocked filter compartment and said flushing outlet;

and a valve in said flushing pathway movable either: (a) to a closed position during the normal filtering mode, wherein a filtering operation is performed in each unblocked filter compartment to filter the fluid flowing from the fluid inlet to the fluid outlet, or (b) to an open position during the flushing mode, wherein the same filtering operation is performed in each unblocked filter compartment, and a flushing operation is performed to flush, via the flushing outlet, in each blocked filter compartment;

said blocking means and filter body being rotatable relative to each other to enable said blocking means to be aligned with, and thereby to perform a flushing operation with respect to, all the axially-extending Sections of the filter body;

said blocking means including a blocking element for each filter compartment blocked by the blocking means; each of said blocking elements including a cavity facing the filter compartment blocked thereby, which cavity communicates with the flushing outlet via said valve.

8. The filter according to claim 7, wherein each said blocking element is in the configuration of a U-shaped wall having an open side facing the filter compartment blocked thereby.

9. The filter according to claim 7, wherein said blocking means includes a blocking member having two blocking elements on opposite sides of the axis of the blocking member.

10. A filter operable in either a filtering mode or in a flushing mode, comprising:

a housing including a cylindrical filter chamber, and further including a fluid inlet, a fluid outlet; and a flushing outlet communicating with said filter chamber;

a cylindrical filter body disposed within said filter chamber and having an upstream face communicating with said fluid inlet and a downstream face communicating with said fluid outlet;

a plurality of partitions defining, with the housing and upstream face of the filter body, a plurality of axially-extending, circumferentially-spaced filter compartments each communicating with an axially-extending section of the filter body;

blocking means for blocking communication between said fluid inlet and at least one filter compartment, while unblocking each remaining filter compartment by permitting communication with said fluid inlet;

a flushing pathway between each blocked filter compartment and said flushing outlet;

and a valve in said flushing pathway movable either: (a) to a closed position during the normal filtering mode, wherein a filtering operation is performed in each unblocked filter compartment to filter the fluid flowing from the fluid inlet to the fluid outlet, or (b) to an open position during the flushing mode, wherein the same filtering operation is performed in each unblocked filter compartment, and a flushing operation is performed to flush, via the flushing outlet, in each blocked filter compartment;

said blocking means and filter body being rotatable relative to each other to enable said blocking means to be aligned with, and thereby to perform a flushing operation with respect to, all the axially-extending sections of the filter body;

said housing including an inner tubular section, an outer cylindrical section defining said cylindrical filter chamber between it and the inner tubular sections, and a partition in said inner tubular section; said inner tubular section being formed with an annular array of inlet openings therethrough on one side of said latter partition, and with an annular array of outlet openings therethrough on the opposite side of said latter partition.

11. The filter according to claim 10, wherein said outer cylindrical section is movable axially with respect to said inner tubular section to operate said valve, and is also rotatable around said inner tubular section to rotate said blocking means with respect to said filter body.

12. The filter according to claim 10, wherein said valve includes an annular seal received between the inner tubular section and the outer cylindrical section in the closed position of the valve, said annular seal being fixed to one of said latter two sections such that it becomes spaced from the other section when the outer cylindrical section is moved axially with respect to the inner tubular section to the open position of the valve.

13. The filter according to claim 10, wherein said outer cylindrical section and said cylindrical filter body are rotatable with respect to said inner tubular section.

14. The filter according to claim 13, wherein said fluid inlet and said fluid outlet are formed at the opposite ends of said inner tubular section of the housing, and said flushing outlet is formed in said outer cylindrical section of the housing.

15. The filter according to claim 14, wherein said blocking means comprises a blocking member secured to said inner tubular section of the housing to block one of said inlet openings therethrough.

16. The filter according to claim 10, wherein said outer housing section further includes a radial vane assembly enclosing said annular array of inlet openings and rotatable with said filter body to direct the inletted fluid to an annular region between the outer housing section and the filter body.

17. The filter according to claim 10, wherein said outer cylindrical section of the housing is formed with said fluid inlet and said fluid outlet, and said inner tubular section of the housing is formed with said flushing outlet and is rotatable with respect to said outer cylindrical section and the cylindrical filter body therein.

18. The filter according to claim 17, wherein said inner tubular section of the housing is formed with a said inlet opening for each of said filter compartments but is devoid of an inlet opening for the at least one compartment to be blocked from the fluid inlet; said flushing outlet being formed in said inner tubular section so as to not be in axial alignment with an inlet opening.

19. The filter according to claim 18, wherein said outer housing section includes a radial vane assembly enclosing said annular array of inlet openings to direct the inletted fluid to an annular region between the outer housing section and the filter body.

20. The filter according to claim 19, wherein said outer housing section further includes a second radial vane assembly enclosing the end of said inner housing section formed with said flushing opening and effective upon rotation of said inner housing section to connect said axial sections of the filter body sequentially to the flushing outlet.

* * * * *